United States Patent [19]

Le

[11] Patent Number: 4,900,569

[45] Date of Patent: Feb. 13, 1990

[54] TERPOLYMERS OF ALKYL ACRYLATES OR METHACRYLATES, AN OLEFINICALLY UNSATURATED HOMO OR HETEROCYCLIC-NITROGEN COMPOUND AND AN ALLYL ACRYLATE OR METHACRYLATE OR PERFLUOROALKYL ETHYL ACRYLATES OR METHACRYLATES

[75] Inventor: Hanh T. Le, Wilmington, Del.

[73] Assignee: Conoco Inc., Ponca City, Okla.

[21] Appl. No.: 265,602

[22] Filed: Oct. 31, 1988

[51] Int. Cl.$^4$ ............................................. C08F 18/20
[52] U.S. Cl. .................................................. 526/245
[58] Field of Search .......................................... 526/245

[56] References Cited

U.S. PATENT DOCUMENTS

| | | |
|---|---|---|
| 2,798,063 | 7/1957 | Fowler, Jr. et al. ............... 526/245 |
| 2,889,282 | 6/1959 | Lorensen . |
| 3,058,818 | 10/1962 | Michaels et al. . |
| 3,147,222 | 9/1964 | Bauer . |
| 3,215,632 | 11/1965 | Hughes et al. . |
| 3,260,728 | 7/1966 | Ilnyckyl . |
| 3,304,260 | 2/1967 | Fields . |
| 3,455,889 | 7/1969 | Coleman ............................. 526/245 |
| 3,868,231 | 2/1975 | Kraats et al. . |
| 3,957,659 | 11/1965 | Hughes et al. . |
| 4,161,392 | 7/1979 | Cusano et al. . |

FOREIGN PATENT DOCUMENTS 695679 10/1964 Canada .
842990 8/1960 United Kingdom .

OTHER PUBLICATIONS

"Copolymers of 4-Vinylpyridine With Fluorinated Acrylates", Carson et al, The British Polymer Journal, Dec. 1976, vol. 8, No. 4, J73460049T.

Primary Examiner—Joseph L. Schofer
Assistant Examiner—N. Sarofim
Attorney, Agent, or Firm—Cleveland R. Williams

[57] ABSTRACT

Terpolymers having enhanced pour point depressant properties are disclosed which comprise (1) an alkyl ester of unsaturated monocarboxylic acid, (2) an olefinically unsaturated homo or heterocyclic-nitrogen compound, and (3) an allyl acrylate or methacrylate or a perfluoroalkyl ethyl acrylate or methacrylate. A process for preparing the terpolymers is additionally disclosed.

21 Claims, No Drawings

TERPOLYMERS OF ALKYL ACRYLATES OR METHACRYLATES, AN OLEFINICALLY UNSATURATED HOMO OR HETEROCYCLIC-NITROGEN COMPOUND AND AN ALLYL ACRYLATE OR METHACRYLATE OR PERFLUOROALKYL ETHYL ACRYLATES OR METHACRYLATES

BACKGROUND OF THE INVENTION

1. Field of the Invention

This invention relates to new compounds comprising terpolymers of alkyl acrylates or methacrylates, an olefinically unsaturated homo or heterocyclic-nitrogen compound and an allyl acrylate or methacrylate or perfluoroalkyl ethyl acrylates or methacrylates and to the preparation of such compositions. These terpolymers are suitable for use as pour point depressants for a wide variety of oil compositions. The copending application of Hanh T. Le entitled "Oil Compositions Containing Terpolymers of Alkyl Acrylates Or Methacrylates, An Olefinically Unsaturated Homo Or Heterocyclic-Nitrogen Compound And An Allyl Acrylate Or Methacrylate Or Perfluoroalkyl Ethyl Acrylates Or Methacrylates", Serial No. 265,626, filed Oct. 31, 1988, describes oil compositions suitable for use in combination with the terpolymers disclosed herein, the disclosure of which is incorporated herein by reference.

2. Description Of The Prior Art

Processes and catalysts for the production of polymers of alkyl acrylates and alkyl methacrylates and/or heterocyclic-nitrogen compounds are known and are currently practiced commercially.

For example, U.S. Pat. No. 2,889,282, issued June 2, 1959, relates to lubricating oil compositions containing an oil soluble copolymer consisting of (1) a monovinyl-substituted pyridine, and (2) a mixture of a $C_{16}$ to $C_{20}$ alkyl ester of an acrylic acid and a $C_{10}$ to $C_{14}$ alkyl ester of an acrylic acid. The polymers are described as possessing particularly good pour point depressing properties.

U.S. Pat. No. 3,260,738, issued July 12, 1966, discloses a process for polymerizing ethylene with lauryl methacrylate and n-vinyl-2-pyrrolidone at increased temperature and pressure, using benzene as a solvent and di-t-butyl peroxide as a promoter. The polymers are described as oil additives which impart improved flow of fuel at low temperatures and improved pour point characteristics to middle distillates.

U.S. Pat. No. 3,868,231, issued Feb. 25, 1975, relates to residual fuels having improved low temperature flow properties. The residual fuel flow property is enhanced by the addition thereto of a copolymer of a $C_{18}$ to $C_{28}$ alkyl ester of acrylic acid and 4-vinylpyridine.

U.S. Pat. No. 3,957,659, issued May 18, 1976, discloses a copolymer which imparts improved low-temperature flow properties to crude oils having a high wax content. The copolymers consist of a $C_{14}$ to $C_{30}$ alkyl ester of acrylic or methacrylic acid and 4-vinyl pyridine.

U.S. Pat. No. 4,161,392, issued July 17, 1979, relates to nitrogen containing copolymers which are suitable for use as carburetor detergents and corrosion inhibitors. The copolymers consist of the olefin polymerization product of (1) a $C_1$ to $C_4$ alkyl methacrylate or aromatic ester of an unsaturated aliphatic mono-, di- or polycarboxylic acid, (2) a $C_8$ to $C_{20}$ saturated or unsaturated, substituted or unsubstituted, aliphatic or aromatic ester of an unsaturated mono-, di- or polyaliphatic carboxylic acid having 1 to 6 carbon atoms, and (3) an ethylenically unsaturated compound containing a nitrogen atom, e.g., dimethyl amino ethyl methacrylate acid or 4-vinyl pyridine.

It must be noted, however, that the specific terpolymers comprising the alkyl esters of unsaturated monocarboxylic acid, olefinically unsaturated homo or heterocyclic-nitrogen compounds, and allyl acrylate or methacrylate or perfluoroalkyl ethyl acrylates or methacrylates claimed herein are new.

SUMMARY OF THE INVENTION

This invention encompasses new compositions that are particularly suitable for use as pour point depressants for oil compositions. In particular, the compositions comprise an alkyl ester of unsaturated monocarboxylic acid, an olefinically unsaturated homo or heterocyclic-nitrogen compound and allyl acrylate or methacrylate or a perfluoroalkyl ethyl acrylate or methacrylate terpolymer having pour point depressant properties, said terpolymer comprising the reaction product of (a) a monomeric alkyl ester of carboxylic acid or a mixture of alkyl esters of carboxylic acid having the formula:

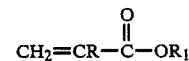

wherein R is H or $CH_3$ and $R_1$ is alkyl having from about 1 to about 30 carbon atoms; (b) vinyl pyridine; and (c) allyl acrylate or methacrylate or a perfluoroalkyl ethyl acrylate or methacrylate or a mixture of perfluoroalkyl ethyl acrylates or methacrylates, said perfluoroalkyl ethyl acrylates or methacrylates having the formula:

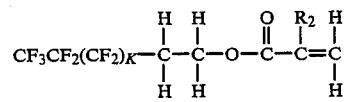

wherein $R_2$ is H or $CH_3$, and K is an integer of from about 1 to about 20.

DETAILED DESCRIPTION OF THE INVENTION

The present invention relates to terpolymers of alkyl acrylates or methacrylates, an olefinically unsaturated homo or heterocyclic-nitrogen compound and an allyl acrylate or methacrylate or perfluoroalkyl ethyl acrylates or methacrylates which are particularly suitable for use in oil compositions as pour point additives.

The allkyl acrylate or methacrylate monomers of the present invention are conveniently prepared by reacting the desired primary alcohol with acrylic acid or methacrylic acid in a conventional esterification reaction. Direct esterification of acrylic acid or methacrylic acid with alcohols readily takes place in the presence of a strong acid catalyst such as sulfuric acid, a soluble sulfonic acid or sulfonic acid resins. Another method of producing alkyl acrylates or methacrylates involves contacting acrylic acid or methacrylic acid with a suitable olefin in the presence of a strong anhydrous acid catalyst.

Typical examples of starting alcohols suitable for use herein include the $C_1$ to $C_{30}$ primary alcohols. It should be noted that all of the starting alcohols, e.g., the $C_1$ to $C_{30}$ alcohols, can be reacted with acrylic acid or methacrylic acid to form the desirable acrylates and methacrylates.

Suitable alkyl acrylates or alkyl methacrylates contain from about 1 to about 30 carbon atoms, especially from about 4 to about 28 carbon atoms, preferably from about 4 to about 24 carbon atoms in the alkyl chain.

Desirable alkyl acrylates are preferably selected from the group consisting of methyl acrylate, ethyl acrylate, propyl acrylate, butyl acrylate, pentyl acrylate, hexyl acrylate, heptyl acrylate, octyl acrylate, nonyl acrylate, decyl acrylate, undecyl acrylate, dodecyl acrylate, tridecyl acrylate, tetradecyl acrylate, pentadecyl acrylate, hexadecyl acrylate, heptadecyl acrylate, octadecyl acrylate, nonadecyl acrylate, eicosyl acrylate, heneicosyl acrylate, docosyl acrylate, tricosyl acrylate, tetracosyl acrylate, pentacosyl acrylate, hexacosyl acrylate, heptacosyl acrylate, octacosyl acrylate, nonacosyl acrylate, and triacontyl acrylate and mixtures thereof.

Similarly, typical examples of the alkyl methacrylates include the methacrylates selected from the group consisting of methyl methacrylate, ethyl methacrylate, propyl methacrylate, butyl methacrylate, pentyl methacrylate, hexyl methacrylate, heptyl methacrylate, octyl methacrylate, nonyl methacrylate, decyl methacrylate, undecyl methacrylate, dodecyl methacrylate, tridecyl methacrylate, tetradecyl methacrylate, pentadecyl methacrylate, hexadecyl methacrylate, heptadecyl methacrylate, octadecyl methacrylate, nonadecyl methacrylate, eicosyl methacrylate, heneicosyl methacrylate, docosyl methacrylate, tricosyl methacrylate, tetracosyl methacrylate, pentacosyl methacrylate, hexacosyl methacrylate, heptacosyl methacrylate, octacosyl methacrylate, nonacosyl methacrylate and triacontyl methacrylate and mixtures thereof.

It is to be noted that the individual alkyl acrylate or methacrylate monomers can be incorporated into the terpolymers herein. However, mixtures of the alkyl acrylates or methacrylates are highly desirable in the production of said terpolymers. Mixtures of alkyl acrylates or methacrylates preferably contain 4 to 28 carbon atoms in the alkyl moiety.

The second monomer of the terpolymers herein comprises an olefinically unsaturated homo or heterocyclic-nitrogen compound which is commonly referred to as the vinyl pyridines. Originally vinyl pyridine, including its homologs, which are selectively called pyridine bases, were isolated from coal tar and coal gases, e.g., from the volatile by-products in the pyrolysis of coal. The noncondensable gas contains ammonia and most of the useable pyridine bases formed during coking.

More recently, vinyl pyridines have been prepared by the condensation of 2- or 4-methylpyridine by heating in the presence of formaldehyde to yield the corresponding adol, e.g., 2-(2-hydroxyethyl) pyridine. Dehydration by treatment with base yields 2- or 4-vinyl pyridine or 5-ethyl-2-vinylpyridine.

The preferred vinyl pyridine for use herein is 4-vinylpyridine, however, the 2-vinyl pyridine or 5-ethyl-2-vinylpyridine or mixtures of the above can be utilized to produce the desirable terpolymer.

The third monomer of the terpolymers herein is allyl acrylate or methacrylate or a perfluoroalkyl ethyl acrylate or methacrylate or a mixture of perfluoroalkyl ethyl acrylates or methacrylates, said perfluoroalkyl ethyl acrylates or methacrylates having the formula:

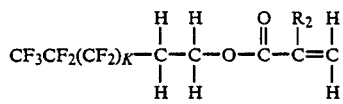

wherein $R_2$ is H or $CH_3$, and K is an integer of from about 1 to about 20.

The perfluoroalkyl ethyl acrylates or methacrylates herein can conveniently be prepared using conventional techniques and catalysts. For example, the starting compound perfluoroethylene is subjected to an oligomerization process to produce a perfluoroalkyl compound and the perfluoroalkyl compound is converted to perfluoroalkyl iodide. Next, the perfluoroalkyl iodide is reacted with ethylene or a similar compound to produce perfluoroalkyl ethyl iodide and the iodide compound thus produced is converted to an alcohol. Finally, the perfluoroalkyl ethyl alcohol is reacted with either acrylic acid or methacrylic acid to produce the perfluoroalkyl ethyl acrylate or methacrylate. It should be noted the chain length of the alkyl moiety of the compounds herein is determined by the number of perfluoroethylene groups added to the alkyl moiety during the oligomerization reaction.

The allyl acrylates or methacrylates herein are conveniently prepared by the direct esterification of allyl alcohol with either acrylic acid or methacrylic acid. The reaction is acid catalyzed, for example, by sulfuric acid or p-toluene sulfonic acid, and is driven forward by the continuous removal of water. One important method of removing water from the reaction medium includes the use of a ternary system or mixture. Two representative ternary mixtures or systems include benzene-allyl alcohol-water and diallyl ether-allyl alcohol-water. It should be noted that the benzene and diallyl ether diluents lower the temperature in the reaction vessel; which in turn minimizes by-product formation, principally diallyl ether.

The acrylate compounds containing the perfluoroalkyl ethyl moiety preferably are members selected from the group consisting of perfluoromethyl ethyl acrylate, perfluoroethyl ethyl acrylate, perfluoropropyl ethyl acrylate, perfluorobutyl ethyl acrylate, perfluoropentyl ethyl acrylate, perfluorohexyl ethyl acrylate, perfluoroheptyl ethyl acrylate, perfluorooctyl ethyl acrylate, perfluorononyl ethyl acrylate, perfluorodecyl ethyl acrylate, perfluoroundecyl ethyl acrylate, perfluorododecyl ethyl acrylate, perfluorotridecyl ethyl acrylate, perfluorotetradecyl ethyl acrylate, perfluoropentadecyl ethyl acrylate, perfluorohexadecyl ethyl acrylate, perfluoroheptadecyl ethyl acrylate, perfluorooctadecyl ethyl acrylate, perfluorononadecyl ethyl acrylate, and perfluoroeicosyl ethyl acrylate and mixtures thereof.

Similarly the methacrylate compounds herein preferably are members selected from the group consisting of perfluoromethyl ethyl methacrylate, perfluoroethyl ethyl methacrylate, perfluoropropyl ethyl methacrylate, perfluorobutyl ethyl methacrylate, perfluoropentyl ethyl methacrylate, perfluorohexyl ethyl methacrylate, perfluoroheptyl ethyl methacrylate, perfluorooctyl ethyl methacrylate, perfluorononyl ethyl methacrylate, perfluorodecyl ethyl methacrylate, perfluoroundecyl ethyl methacrylate, perfluorododecyl ethyl methacrylate, perfluorotridecyl ethyl methacrylate, perfluorotetradecyl ethyl methacrylate, perfluoropentadecyl ethyl methacrylate, perfluorohexadecyl ethyl methacrylate, perfluoroheptadecyl ethyl methacrylate, perfluorooctadecyl ethyl methacrylate, perfluorononadecyl ethyl methacrylate, and perfluoroeicosyl ethyl methacrylate and mixtures thereof. It is to be noted that individual monomers or mixtures of the individual monomers of the perfluoroalkyl ethyl acrylates or methacrylates herein can be used to produce the terpolymers herein. The alkyl moiety of the perfluoroalkyl ethyl acrylates or methacrylates generally contain from about 1 to about 20 carbon atoms, especially from about 3 to about 15 carbon atoms, preferably from about 3 to about 12 carbon atoms.

The terpolymers useful in the practice of this invention can be prepared in a conventional manner by bulk, solution or dispersant polymerization methods using known catalysts. Thus, the terpolymers utilized by this invention can be prepared from the corresponding monomers with a diluent such as water in a heterogeneous system, usually referred to as emulsion or suspension polymerization, or with a solvent such as toluene, benzene, ethylene dichloride, methyl isobutyl ketone, 4-methyl 2-pentanone or in a homogeneous system, normally referred to as solution polymerization. Solution polymerization for example in toluene, methyl isobutyl ketone, 4-methyl 2-pentanone or a solvent having similar chain transfer activity is the preferred method used in forming the terpolymers disclosed herein, because this method and solvent produce preferred terpolymers characterized by a molecular weight in the range of from about 1,000 to about 100,000. When a terpolymer is dissolved in a solvent, the solvent normally will comprise from about 40 to about 90 weight percent based on the weight of the terpolymer or individual monomers which combine to produce the terpolymer.

Polymerization of the monomers used herein readily takes place under the influence of heat, light and/or catalysts. Suitable catalysts include free radical catalysts such as azo bis isobutyl nitrile and peroxide type free radical catalysts such as benzoyl peroxide, lauryl peroxide, or t-butylhydroperoxide. The preferred free radical catalyst is azo bis isobutyl nitrile. The catalysts, when used, are employed in concentrations ranging from a few hundreds percent to two percent by weight of the monomers. The preferred concentration is from about 0.2 to about 1.0 percent by weight of the monomers.

Copolymerization of the monomers used herein takes place over a fairly narrow temperature range depending upon the particular monomers and catalyst utilized in the reaction. For example, polymerization can take place at temperatures from about 50° C. to about 200° C. It is to be noted that below 50° C. the terpolymer will not form in appreciable amounts and above 200° C. the terpolymer will begin to decompose. Thus, a preferred temperature range is from about 82° C. to 150° C., an especially preferred temperature range is from about 85° C. to about 120° C. The polymerization reaction is preferably carried out in an inert atomsphere, for example, nitrogen or argon to favor the formation of terpolymers that have the desired molecular weights and high viscosities. The reactions are preferably conducted at ambient pressure, however, it is to be noted that higher pressures can be used, for example, pressures of from ambient pressure to about 25 psig can be employed in the reaction.

Preferably, the polymerization reaction is carried out to substantial completion so that the finished product is essentially comprised of the ratio of monomers introduced into the reaction vessel. Normally, a reaction time of from 1 to about 72 hours, preferably from 1 to about 50 hours, especially from 1 to about 10 hours, is sufficient to complete the polymerization process.

The terpolymers disclosed herein have an average molecular weight of greater than about 1,000, especially a molecular weight range of from about 1,000 to about 100,000, preferably from about 1,000 to about 70,000, most preferably from about 1,000 to about 50,000.

Specific examples of terpolymers which can be used according to the invention are the 0.01:0.001:0.009 to 1.0:1.0:1.0, especially the 0.01:0.001:0.01 to 0.8:0.8:0.8, preferably the 0.01:0.001:0.01 to 0.5:0.5:0.5 mole ratio terpolymer of (a) alkyl ester of unsaturated monocarboxylic acid, (b) olefinically unsaturated homo or heterocyclic-nitrogen compound, and (c) allyl acrylate or methacrylate or perfluoroalkyl ethyl acrylate or methacrylate.

METHOD OF PREPARATION

In a preferred method of preparation, terpolymers comprising (a) an alkyl ester of carboxylic acid or a mixture of alkyl esters of carboxylic acid, (b) vinyl pyridine, and (c) allyl acrylate or methacrylate or a perfluoroalkyl ethyl acrylate or methacrylate or a mixture of perfluoroalkyl ethyl acrylates or methacrylates are prepared in the following manner.

Before proceeding with the reaction, the alkyl acrylate or methacrylate, vinyl pyridine, allyl acrylate or methacrylate, or perfluoroalkyl ethyl acrylate or methacrylate monomers are prewashed with a 5 percent sodium hydroxide (NaOH) solution to remove inhibitors. Alternatively, the monomers can be dried over magnesium sulfate ($MgSO_4$).

A 1-liter, 4-neck Pyrex glass resin kettle with detachable top and 2 screw caps (manufactured by ACE Glass Inc., Vineland, N.J.) equipped with a glass mechanical stirrer e.g., glass shaft, containing Teflon ® blades, a heating mantle containing a thermal couple (manufactured by the Thermal Electric Co., Saddle Brook, N.J.), a thermometer, a 250 ml addition funnel and a water cooled reflux condenser is vacuumed at 3 to 5 mm of Hg to remove air and then flushed with nitrogen gas until the system equalized at atmospheric pressure in the resin kettle. Alternatively, a magnetic stirring bar, including apparatus can be used to replace the glass mechanical stirrer. The top of the addition funnel was equipped with a rubber septum and the top of the reflux condenser with a rubber stopper containing a clear plastic vacuum tube. The plastic tube from the rubber stopper connected to a firestone valve (manufactured by the Aldrich Co., Milwaukee, Wis.) containing a lead to vacuum and a lead to a gas source. Vacuum was supplied to the system by a Precision Vacuum Pump, Model Number DD195, manufactured by the GCA Corporation, Precision Scientific Group, Chicago, Ill.

The resin kettle is charged with from about 100 ml to about 300 ml of a solvent selected, for example, from toluene, methyl isobutyl ketone, benzene or ethylene dichloride. Next, from about 0.01 to about 1.0 mole of the desired alkyl acrylate or methacrylate or mixture of alkyl acrylates or methacrylates is added to the resin kettle. Examples of suitable alkyl acrylate or methacrylate monomers include acrylates or methacrylates containing the methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl and triacontyl moieties and mixtures thereof.

Then, from about 0.009 to about 1.0 mole of allyl acrylate or methacrylate or 0.009 to about 1.0 mole of perfluoroalkyl ethyl acrylate or methacrylate (dissolved in from about 5 ml to abut 100 ml of methyl isobutyl ketone) or a mixture of perfluoroalkyl ethyl acrylates or methacrylates are added to the resin kettle. Examples of perfluoroalkyl ethyl acrylates or methacrylates include the acrylates or methacrylates containing the perfluoromethyl ethyl, perfluoroethyl ethyl, perfluoropropyl ethyl, perfluorobutyl ethyl, perfluoropentyl ethyl, perfluorohexyl ethyl, perfluoroheptyl ethyl, perfluorooctyl ethyl, perfluorononyl ethyl, perfluorodecyl ethyl, perfluoroundecyl ethyl, perfluorododecyl ethyl, perfluorotridecyl ethyl, perfluorotetradecyl ethyl, perfluoropentadecyl ethyl, perfluorohexadecyl ethyl, perfluoroheptadecyl ethyl, perfluorooctadecyl ethyl, perfluorononadecyl ethyl, and perfluoroeicosyl ethyl moieties and mixtures thereof.

Finally, from about 0.001 mole to about 1.0 mole of vinyl pyridine and from about 0.20 gram to about 1.5 grams of a free radical catalyst dissolved in from about 10 ml to about 100 ml of toluene and 2 ml to 20 ml of methyl isobutyl ketone are charged to the addition funnel using a 50 cc glass syringe manufactured by Becton-Dickenson and Company and sold commercially by the Sargent Welch Company, Skokie, Ill. Examples of suitable vinyl pyridines include 4-vinyl pyridine, 2-vinyl pyridine and 5-ethyl-2-vinyl pyridine. Free radical catalysts which readily catalyze the polymerization reactions herein include azo bis isobutyl nitrile, benzoyl peroxide, lauryl peroxide and 5-butylhydroperoxide.

The entire system is degassed with a vacuum pressure of from about 5 mm Hg to about 25 mm Hg and flushed with nitrogen (twice). The reaction mixture in the resin kettle is heated to a temperature of from about 82° C. to about 100° C. and the mixture added to the addition funnel is slowly added to the reaction mixture in the resin kettle over a time period of from about 1 hour to about 72 hours, especially 1 hour to about 24 hours, preferably 1 hour to about 10 hours.

The foregoing method of preparation is illustrative of a preferred mode for preparing the terpolymers herein. Also in accordance with the above-described method the 0.01:0.001:0.009 to about 1.0:1.0:1.0 mole ratio terpolymers substantially as disclosed herein can be prepared by reacting the proper monomer weight ratios to produce the desired terpolymer.

The following examples are illustrative of the invention described herein and are not intended to limit the scope thereof.

EXAMPLE I

The method of preparation procedure was followed to prepare an alkyl acrylate/vinyl pyridine/perfluoroalkyl ethyl acrylate terpolymer with the following exceptions:

An alkyl acrylate (70 grams, 0.196 mole) designated as $C_{22}$ alkyl acrylate was dissolved in 150 ml of toluene and added to the resin kettle. The $C_{22}$ alkyl acrylate was a mixture of $C_{18}$ to $C_{22}$ alkyl acrylates with at least 50 percent of the acrylates having 22 carbon atoms in the alkyl group. Next, 5 grams (0.0095 mole) of a perfluoroalkyl ethyl acrylate mixture mixed with 10 ml of methyl isobutyl ketone was added to the kettle. The perfluoroalkyl ethyl acrylate monomer mixture had the following formula:

$$CF_3CF_2(CF_2)_K C_2H_4OC(O)CH=CH_2$$

wherein the monomeric mixture consisted essentially of:
(1) 0–10% monomer wherein K is 4 or less;
(2) 45–75% monomer wherein K is 6;
(3) 20–40% monomer wherein K is 8;
(4) 1–20% monomer wherein K is 10; and
(5) 0.5% monomer wherein K is 12.

Then, 6 ml (0.055 mole) of 4-vinyl pyridine and 0.80 gram (0.0048 mole) of azo bis isobutyl nitrile mixed with 4 ml of methyl isobutyl ketone were added to the addition funnel.

The mixture in the resin kettle was heated to 82° C. at atmospheric pressure and the solution of 4-vinyl pyridine and azo bis isobutyl nitrile in the addition funnel was slowly added to the mixture in the resin kettle over a period of six hours.

The reaction mixture was cooled and the solvent removed by vacuum. The product was a brown waxy solid (69 grams) with a yield of 86 percent.

EXAMPLE II

The method of preparation procedure was followed to prepare a $C_{22}$ alkyl acrylate, 4-vinyl pyridine, allyl acrylate terpolymer with the following exceptions:

The individual monomers of the terpolymer were washed with 5 percent sodium hydroxide (NaOH) and dried over magnesium sulfate ($MgSO_4$). To the resin kettle, was added 45 grams (0.126 mole) of $C_{22}$ alkyl acrylate and 2 grams (0.0178 mole) of allyl acrylate) mixed with 150 ml of toluene. The $C_{22}$ alkyl acrylate was a mixture of $C_{18}$ to $C_{22}$ alkyl acrylates with at least 50 percent of the acrylates having 22 carbon atoms in the alkyl group.

To the addition funnel was added 3 ml (0.027) of 4-vinyl pyridine and 0.4 gram (0.0024 mole) of azo bis isobutyl nitrile dissolved in 10 ml of toluene and 5 ml of 4-methyl 2-pentanone. Nitrogen gas was flowed through the system for ¼ hour, the reaction mixture in the resin kettle was heated to 82° C. and the mixture in the addition funnel was slowly added to the resin kettle over a period of 6 hours.

The resulting terpolymer was recovered by heating the reaction mixture at 195° C. at 1 mm Hg for 1 hour to remove the solvent. The resulting terpolymer was a brown solid (41 grams) with a yield of 87 percent.

EXAMPLE III

The procedure of Example I is followed to produce an alkyl acrylate/vinyl pyridine/perfluoroalkyl ethyl acrylate terpolymer with the following exception:

An alkyl acrylate designated as $C_{18}$ alkyl acrylate is substituted for the $C_{22}$ alkyl acrylate. The $C_{18}$ alkyl acrylate is a mixture of $C_{12}$ to $C_{20}$ alkyl acrylates with at least 50 percent of the acrylates having 18 carbon atoms in the alkyl group. A terpolymer having substantially similar properties to the terpolymer of Example I is produced.

EXAMPLE IV

The procedure of Example II was followed to produce a terpolymer with the following exceptions:

An alkyl acrylate designated as $C_{18}$ alkyl acrylate (33 grams) was substituted for the $C_{22}$ alkyl acrylate. In addition, 11.2 grams of allyl acrylate and 10 ml of 4-vinyl pyridine were used in the reaction. The terpolymer produced had substantially similar properties to the terpolymer of Example II.

EXAMPLE V TO VIII

The pour point enhancing properties of the terpolymers produced in Examples I and II were tested in accordance with the procedure set forth in ASTM-D97. The pour point properties of the terpolymers of Examples I and II were compared with a blank and with Shellswim 5X ® and Shellswim IIT ®, two well known pour point depressants marketed commercially by the Shell Oil Company, Houston, Tex. All of the additives were added to the oil composition at concentrations of 1,000 ppm active and 46.11° C. preheat.

TABLE 1

| Ex. | Crude Oils | Blank | Pour Point (°C.) Terpolymer Of Ex. I[1] | Terpolymer of Ex. II[2] | Shellswim 5X[3] ® | Shellswim 11T[4] ® |
|---|---|---|---|---|---|---|
| V | Bombay | 29.44 | 7.22 | −3.89 | 10.00 | 12.78 |
| VI | Kotter | 26.67 | 10.00 | 10.00 | 10.00 | 7.22 |
| VII | Delhi 87 | 26.67 | 18.33 | 21.11 | 21.11 | 21.11 |
| VIII | New Zealand | 32.22 | 21.11 | — | 21.11 | 21.11 |

[1]Terpolymer of Ex. I - $C_{18}$-$C_{22}$ alkyl acrylate/4-vinyl pryridine/$C_3$-$C_{15}$ fluoroalkyl ethyl acrylate
[2]Terpolymer of Ex. II - $C_{18}$-$C_{22}$ alkyl acrylate/4-vinyl pyridine/allyl acrylate
[3]Shellswim 5X ® - A $C_{18}$-$C_{22}$ alkylacrylate ester homopolymer. Sold commercially by the Shell Oil Co., Houston, Texas
[4]Shellswim 11T ® - A $C_{18}$-$C_{22}$ alkylacrylate and 4-vinyl pyridine copolymer sold commercially by the Shell Oil Company, Houston Texas As can readily be determined from the above test results, the terpolymers produced according to the procedure set forth herein gave superior or comparable pour point results when compared to commercial pour point additives for crude oils.

It should be noted that the methacrylate analogue of the acrylate monomers used to formulate the terpolymers herein may be substituted for the acrylate analogues herein wth similar results and pour point properties.

Obviously, many modifications and variations of the invention, as herein above set forth, can be made without departing from the spirit and scope thereof, and therefore only such limitations should be imposed as are indicated in the appended claims.

I claim:

1. An alkyl ester of unsaturated monocarboxylic acid, an olefinically unsaturated homo or heterocryclic-nitrogen compound and allyl acrylate or methacrylate or a perfluoroalkyl ethyl acrylate or methacrylate terpolymer having pour point depressant properties, said terpolymer comprising the reaction product of (a) a monomeric alkyl ester of carboxylic acid or a mixture of alkyl esters of carboxylic acid having the formula:

wherein R is H or $CH_3$ and $R_1$ is alkyl having from about 1 to about 30 carbon atoms; (b) vinyl pyridine; and (c) allyl acrylate or methacrylate or a perfluoroalkyl ethyl acrylate or methacrylate or a mixture of perfluoroalkyl ethyl acrylates or methacrylates, said perfluoroalkyl ethyl acrylates or methacrylates having the formula:

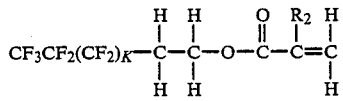

wherein $R_2$ is H or $CH_3$, and K is an integer of from about 1 to about 20.

2. The terpolymer of claim 1 wherein components (a), (b), and (c) are reacted in a mole ratio of from about 0.01:0.001:0.009 to about 1.0:1.0:1.0, said terpolymer having a molecular weight of at least about 1,000.

3. The terpolymer of claim 1 having a molecular weight of from about 1,000 to about 100,000.

4. The terpolymer of claim 1 wherein $R_1$ of component (a) is alkyl having from about 4 to about 28 carbon atoms.

5. The terpolymer of claim 1 wherein the monomeric alkyl ester of carboxylic acid of component (a) is a member selected from the group consisting of methyl acrylate, ethyl acrylate, propyl acrylate, butyl acrylate, pentyl acrylate, hexyl acrylate, heptyl acrylate, octyl acrylate, nonyl acrylate, decyl acrylate, undecyl acrylate, dodecyl acrylate, tridecyl acrylate, tetradecyl acrylate, pentadecyl acrylate, hexadecyl acrylate, heptadecyl acrylate, octadecyl acrylate, nonadecyl acrylate, eicosyl acrylate, heneicosyl acrylate, docosyl acrylate, tricosyl acrylate, tetracosyl acrylate, pentacosyl acrylate, hexacosyl acrylate, heptacosyl acrylate, octacosyl acrylate, nonacosyl acrylate, and triacontyl acrylate and mixtures thereof.

6. The terpolymer of claim 1 wherein the monomeric alkyl ester of carboxylic acid of component (a) is a member selected from the group consisting of methyl methacrylate, ethyl methacrylate, propyl methacrylate, butyl methacrylate, pentyl methacrylate, hexyl methacrylate, heptyl methacrylate, octyl methacrylate, nonyl methacrylate, decyl methacrylate, undecyl methacrylate, dodecyl methacrylate, tridecyl methacrylate, tetradecyl methacrylate, pentadecyl methacrylate, hexadecyl methacrylate, heptadecyl methacrylate, octadecyl methacrylate, nonadecyl methacrylate, eicosyl methacrylate, heneicosyl methacrylate, docosyl methacrylate, tricosyl methacrylate, tetracosyl methacrylate, pentacosyl methacrylate, hexacosyl methacrylate, heptacosyl methacrylate, octacosyl methacrylate, nonacosyl methacrylate and triacontyl methacrylate and mixtures thereof.

7. The terpolymer of claim 1 wherein the vinyl pyridine of component (b) is a member selected from the group consisting of 2-vinyl pyridine, 4-vinyl pyridine and 5-ethyl-2-vinyl pyridine and mixtures thereof.

8. The terpolymer of claim 1 wherein the vinyl pyridine of component (b) is 4-vinyl pyridine.

9. The terpolymer of claim 1 wherein K of component (c) is an integer of from about 3 to about 15.

10. The terpolymer of claim 1 wherein the perfluoroalkyl ethyl acrylate of component (c) is a member selected from the group consisting of perfluoromethyl ethyl acrylate, perfluoroethyl ethyl acrylate, perfluoropropyl ethyl acrylate, perfluorobutyl ethyl acrylate, perfluoropentyl ethyl acrylate, perfluorohexyl ethyl acrylate, perfluoroheptyl ethyl acrylate, perfluorooctyl ethyl acrylate, perfluorononyl ethyl acrylate, perfluorodecyl ethyl acrylate, perfluoroundecyl ethyl acrylate, perfluorododecyl ethyl acrylate, perfluorotridecyl ethyl acrylate, perfluorotetradecyl ethyl acrylate, perfluoropentadecyl ethyl acrylate, perfluorohexadecyl ethyl acrylate, perfluoroheptadecyl ethyl acrylate, perfluorooctadecyl ethyl acrylate, perfluorononadecyl ethyl acrylate, and perfluoroeicosyl ethyl acrylate and mixtures thereof.

11. The terpolymer of claim 1 wherein the perfluoroalkyl ethyl methacrylate of component (c) is a member selected from the group consisting of perfluoromethyl ethyl methacrylate, perfluoroethyl ethyl methacrylate, perfluoropropyl ethyl methacrylate, perfluorobutyl ethyl methacrylate, perfluoropentyl ethyl methacrylate, perfluorohexyl ethyl methacrylate, perfluoroheptyl ethyl methacrylate, perfluorooctyl ethyl methacrylate, perfluorononyl ethyl methacrylate, perfluorodecyl ethyl methacrylate, perfluoroundecyl ethyl methacrylate, perfluorododecyl ethyl methacrylate, perfluorotridecyl ethyl methacrylate, perfluorotetradecyl ethyl methacrylate, perfluoropentadecyl ethyl methacrylate, perfluorohexadecyl ethyl methacrylate, perfluoroheptadecyl ethyl methacrylate, perfluorooctadecyl ethyl methacrylate, perfluorononadecyl ethyl methacrylate, and perfluoroeicosyl ethyl methacrylate and mixtures thereof.

12. A terpolymer having pour point depressant properties which is obtained by free radical polymerization of a monomeric mixture comprising from about 0.01 to about 1.0 mole percent of (a) an alkyl ester of carboxylic acid or a mixture of alkyl esters of carboxylic acid having the formula:

wherein R is H or CH$_3$ and R$_1$ is alkyl having from about 1 to about 30 carbon atoms; (b) from about 0.01 to about 0.1 mole percent of vinyl pyridine; and (c) from about 0.01 to about 1.0 mole percent of allyl acrylate or methacrylate or a perfluoroalkyl ethyl acrylate or methacrylate or a mixture of perfluoroalkyl ethyl acrylates or methacrylates, said perfluoroalkyl ethyl acrylates or methacrylates having the formula:

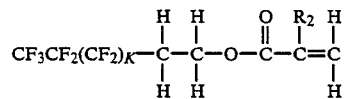

wherein R$_2$ is H or CH$_3$ and K is an integer of from about 3 to about 15, said terpolymer having a molecular weight of at least about 1,000.

13. The terpolymer of claim 12 having a molecular weight of from about 2,000 to about 50,000.

14. The terpolymer of claim 12 wherein R$_1$ of component (a) is alkyl having from about 4 to about 28 carbon atoms.

15. The terpolymer of claim 12 wherein the monomeric alkyl ester of carboxylic acid of component (a) is a member selected from the group consisting of butyl methacrylate, pentyl methacrylate, hexyl methacrylate, heptyl methacrylate, octal methacrylate, nonyl methacrylate, decyl methacrylate, undecyl methacrylate, dodecyl methacrylate tridecyl methacrylate, tetradecyl methacrylate, pentadecyl methacrylate, hexadecyl methacrylate, heptadecyl methacrylate, octadecyl methacrylate, nonadecyl methacrylate, eicosyl methacrylate, heneicosyl methacrylate, docosyl methacrylate, tricosyl methacrylate, tetracosyl methacrylate, pentacosyl methacrylate, hexacosyl methacrylate, heptacosyl methacrylate, and octacosyl methacrylate and mixtures thereof.

16. The terpolymer of claim 12 wherein the monomeric alkyl ester of carboxylic acid of component (a) is a member selected from the group consisting of butyl acrylate, pentyl acrylate, hexyl acrylate, heptyl acrylate, octal acrylate, nonyl acrylate, decyl acrylate, undecyl acrylate, dodecyl acrylate tridecyl acrylate, tetradecyl acrylate, pentadecyl acrylate, hexadecyl acrylate, heptadecyl acrylate, octadecyl acrylate, nonadecyl acrylate, eicosyl acrylate, heneicosyl acrylate, docosyl acrylate, tricosyl acrylate, tetracosyl acrylate, pentacosyl acrylate, hexacosyl acrylate, heptacosyl acrylate, and octacosyl acrylate and mixtures thereof.

17. The terpolymer of claim 12 wherein the vinyl pyridine of component (b) is a member selected from the group consisting of 2-vinyl pyridine and 4-vinyl pyridine and mixtures thereof.

18. The terpolymer of claim 12 wherein the vinyl pyridine of component (b) is 4-vinyl pyridine.

19. The terpolymer of claim 12 wherein K of component (c) is is an integer of from about 3 to about 15.

20. The terpolymer of claim 12 wherein the perfluoroalkyl ethyl acrylate of component (c) is a member selected from the group consisting of perfluoropropyl ethyl acrylate, perfluorobutyl ethyl acrylate, perfluoropentyl ethyl acrylate, perfluorohexyl ethyl acrylate, perfluoroheptyl ethyl acrylate, perfluorooctyl ethyl acrylate, perfluorononyl ethyl acrylate, perfluorodecyl ethyl acrylate, perfluoroundecyl ethyl acrylate, perfluorododecyl ethyl acrylate, perfluorotridecyl ethyl acrylate, perfluorotetradecyl ethyl acrylate, and perfluoropentadecyl ethyl acrylate and mixtures thereof.

21. The terpolymer of claim 12 wherein the perfluoroalkyl ethyl methacrylate of component (c) is a member selected from the group consisting of perfluoropropyl ethyl methacrylate, perfluorobutyl ethyl methacrylate, perfluoropentyl ethyl methacrylate, perfluorohexyl ethyl methacrylate, perfluoroheptyl ethyl methacrylate, perfluorooctyl ethyl methacrylate, perfluorononyl ethyl methacrylate, perfluorodecyl ethyl methacrylate, perfluoroundecyl ethyl methacrylate, perfluorododecyl ethyl methacrylate, perfluorotridecyl ethyl methacrylate, perfluorotetradecyl ethyl methacrylate, and perfluoropentadecyl ethyl methacrylate and mixtures thereof.

* * * * *